(12) United States Patent
Nakar et al.

(10) Patent No.: US 12,335,301 B2
(45) Date of Patent: Jun. 17, 2025

(54) LAYER 7 NETWORK ATTACK DETECTION USING MACHINE LEARNING FEATURE CONTRIBUTION

(71) Applicant: Imperva, Inc., San Mateo, CA (US)

(72) Inventors: Ori Nakar, Givat Shemuel (IL); Jonathan Roy Azaria, Beit Gamliel (IL)

(73) Assignee: Imperva, Inc., San Mateo, CA (US)

( * ) Notice: Subject to any disclaimer, the term of this patent is extended or adjusted under 35 U.S.C. 154(b) by 634 days.

(21) Appl. No.: 17/516,592

(22) Filed: Nov. 1, 2021

(65) Prior Publication Data

US 2023/0135755 A1 May 4, 2023

(51) Int. Cl.
*H04L 29/06* (2006.01)
*H04L 9/40* (2022.01)

(52) U.S. Cl.
CPC .............................. *H04L 63/1441* (2013.01)

(58) Field of Classification Search
CPC .............. H04L 63/0263; H04L 63/126; H04L 63/1441; H04L 63/168
See application file for complete search history.

(56) References Cited

U.S. PATENT DOCUMENTS

| | | | |
|---|---|---|---|
| 11,201,855 B1 * | 12/2021 | Kondamuri | H04L 63/0263 |
| 2020/0036739 A1 * | 1/2020 | Novikov | G06N 20/00 |
| 2020/0186569 A1 * | 6/2020 | Milazzo | H04L 63/08 |
| 2021/0218771 A1 * | 7/2021 | Khouderchah | H04L 63/0263 |
| 2022/0060491 A1 * | 2/2022 | Achleitner | H04L 63/1425 |
| 2022/0400125 A1 * | 12/2022 | Mendelowitz | G06F 18/214 |

* cited by examiner

*Primary Examiner* — Benjamin E Lanier

(57) ABSTRACT

Embodiments of the present disclosure relate to detecting new attack vectors in web application servers based on analyzing requests (e.g., HTTP/S requests) that were flagged as attacks by a machine learning web application firewall (ML WAF) but not by a rule-based WAF. Such requests may be grouped together using a clustering algorithm, and the features that are determined as being high contributors to an overall attack probability in a threshold number of such requests may be used to determine new attack vectors.

18 Claims, 11 Drawing Sheets

| | RCE Keywords | | | | | Query String 4-grams | | | | Client | | | / in url |
|---|---|---|---|---|---|---|---|---|---|---|---|---|---|
| | .exe | python | nmap | java | cht | /.. | =url | d=&c | /**/ | python | chrome | scmp | |
| REQUEST 1 | true | false | false | false | false | true | false | false | false | true | false | false | 0 |
| REQUEST 2 | false | false | false | false | false | false | false | false | true | true | false | false | 5 |
| REQUEST 3 | false | false | false | false | false | false | false | false | true | true | false | false | 5 |

FIG. 3

| | RCE Keywords | | | | | Query String 4-grams | | | | Client | | | /in url |
|---|---|---|---|---|---|---|---|---|---|---|---|---|---|
| | exe | python | nmap | java | cmd | /f.. | =utf | d=&c | /**/ | python | chrome | sqmap | |
| REQUEST 1 | 0 | 0 | 0 | 0 | 0 | 0.1 | 0 | 0 | 0 | 0 | 0 | 0 | 0 |
| REQUEST 2 | 0 | 0 | 0 | 0 | 0 | 0 | 0.2 | 0 | 0 | 0 | 0 | 0 | 0.1 |
| REQUEST 3 | 0 | -0.01 | 0 | 0 | 0 | 0 | 0 | 0 | 0 | 0 | 0 | 0 | 0 |

500 tags.resources=Articles&tags.brands=<testy></testy>'t'atest"atest${a}atest{{7*7}}atest${7*7}

550

| Feature | Value |
|---|---|
| Query string 4-gram | t${a |
| Client | Python |

| Query String 4-grams | | | | Rule |
|---|---|---|---|---|
| <sc | sc< | crl | $chm | |
| REQUEST 1 | 0.18 | 0.17 | 0.16 | 0.11 | naive XSS rule |
| REQUEST 2 | 0.178 | 0.172 | 0.161 | 0.11 | naive XSS rule |
| ⋮ | | | | | |
| REQUEST 3 | 0.11 | 0.11 | 0.11 | 0.18 | Some other rule |

FIG. 6A

| Query String 4-grams | | | |
|---|---|---|---|
| <sc | sc< | crl | $chm |
| 0.8 | 0.65 | 0.7 | -0.1 |

FIG. 6B

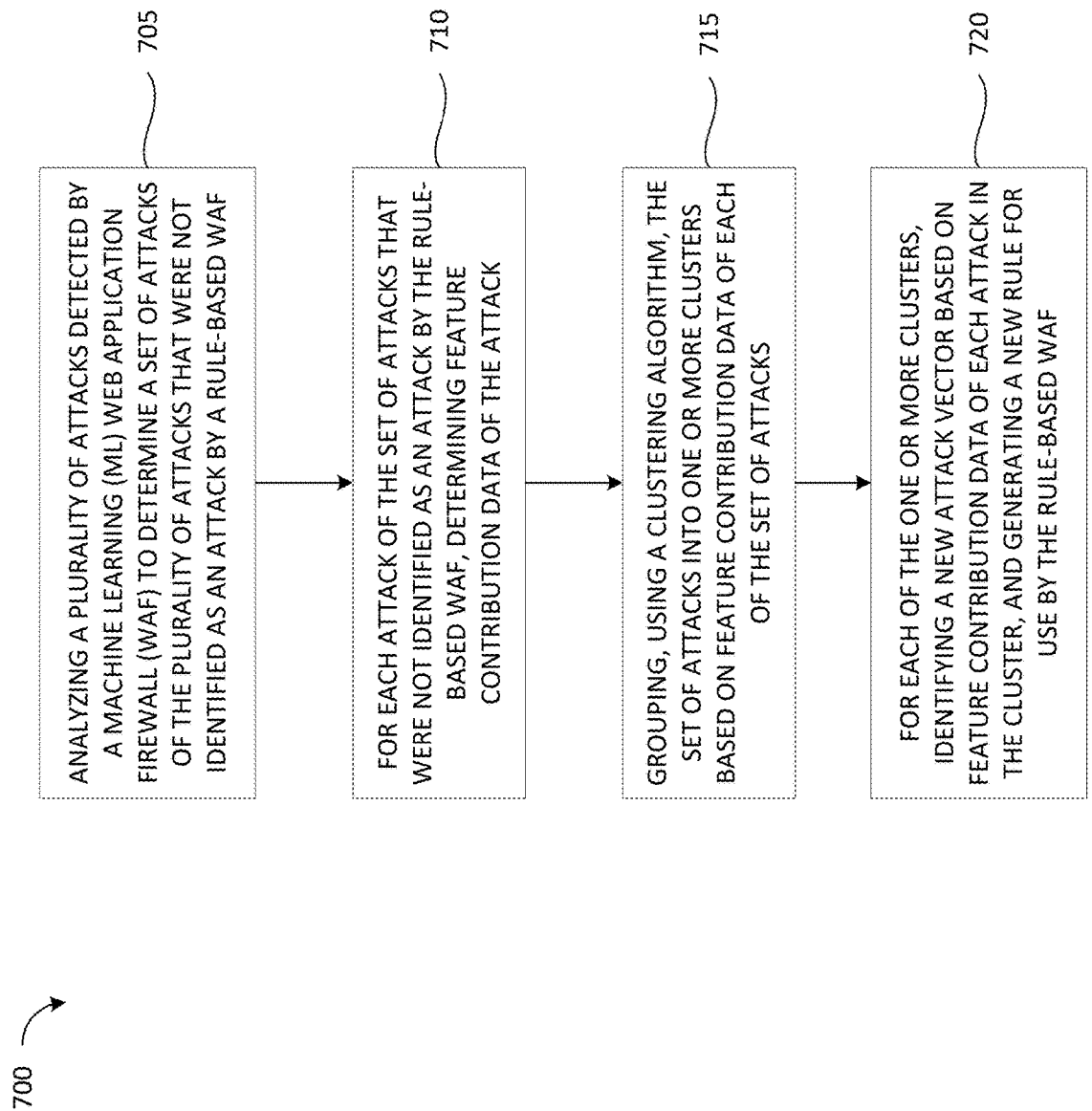

LAYER 7 NETWORK ATTACK DETECTION USING MACHINE LEARNING FEATURE CONTRIBUTION

TECHNICAL FIELD

Aspects of the present disclosure relate to networks that store data and execute web applications, and more particularly, to providing enhanced security for data and web applications in a network.

BACKGROUND

A data center may include database servers and other devices on which data is stored and on which web applications may execute. A data center may implement a data repository, which may refer to any appropriate storage system such as an object storage system (e.g., Amazon S3' system), a database, a filesystem, and a cloud storage layer, for example. Because a data center may be accessed remotely (e.g., via the internet), it may be subject to attacks such as e.g., hacking attempts, malicious activity carried out by bots, scraping, and distributed denial of service (DDoS) attacks, among others. Thus, data centers may use third party security platforms that provide application and data security by protecting against such attacks. Many security platforms utilize a web application firewall (WAF) which may be deployed on premises or in the cloud (e.g., deployed across a globally distributed content distribution network (CDN)). For example, a WAF may be positioned on a reverse proxy server positioned at a CDN's edge and may scrub all incoming application traffic before it's sent to backend servers of the CDN.

A WAF protects web applications (e.g., at the layer 7 level) by filtering, monitoring, and blocking any malicious HTTP/S requests traveling to the web applications, and prevents any unauthorized data from leaving the web applications. Just as a proxy server acts as an intermediary to protect the identity of a client, a WAF operates in similar fashion but in the reverse (hence a reverse proxy), and acts as an intermediary that protects web application servers from a potentially malicious client. A WAF may inspect every request at the connection level, the request format and structure level, and the content level.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a diagram illustrating an example of feature sets for multiple requests, in accordance with some embodiments of the present disclosure.

FIG. 4A is a diagram illustrating an example of feature contribution data for multiple requests, in accordance with some embodiments of the present disclosure.

FIG. 4B is a diagram illustrating an example of feature contributions that have a high contribution to an attack probability, in accordance with some embodiments of the present disclosure.

FIG. 6A is a diagram illustrating an example of feature contribution data that has been labeled with a rule used by a rule-based WAF, in accordance with some embodiments of the present disclosure.

FIG. 6B is a diagram illustrating an example of feature contribution data for a request that was not blocked by a rule-based WAF, in accordance with some embodiments of the present disclosure.

FIG. 7 is a flow diagram of a method of generating one or more rules for use by a rule-based WAF, in accordance with some embodiments of the present disclosure.

DETAILED DESCRIPTION

Figure 1:
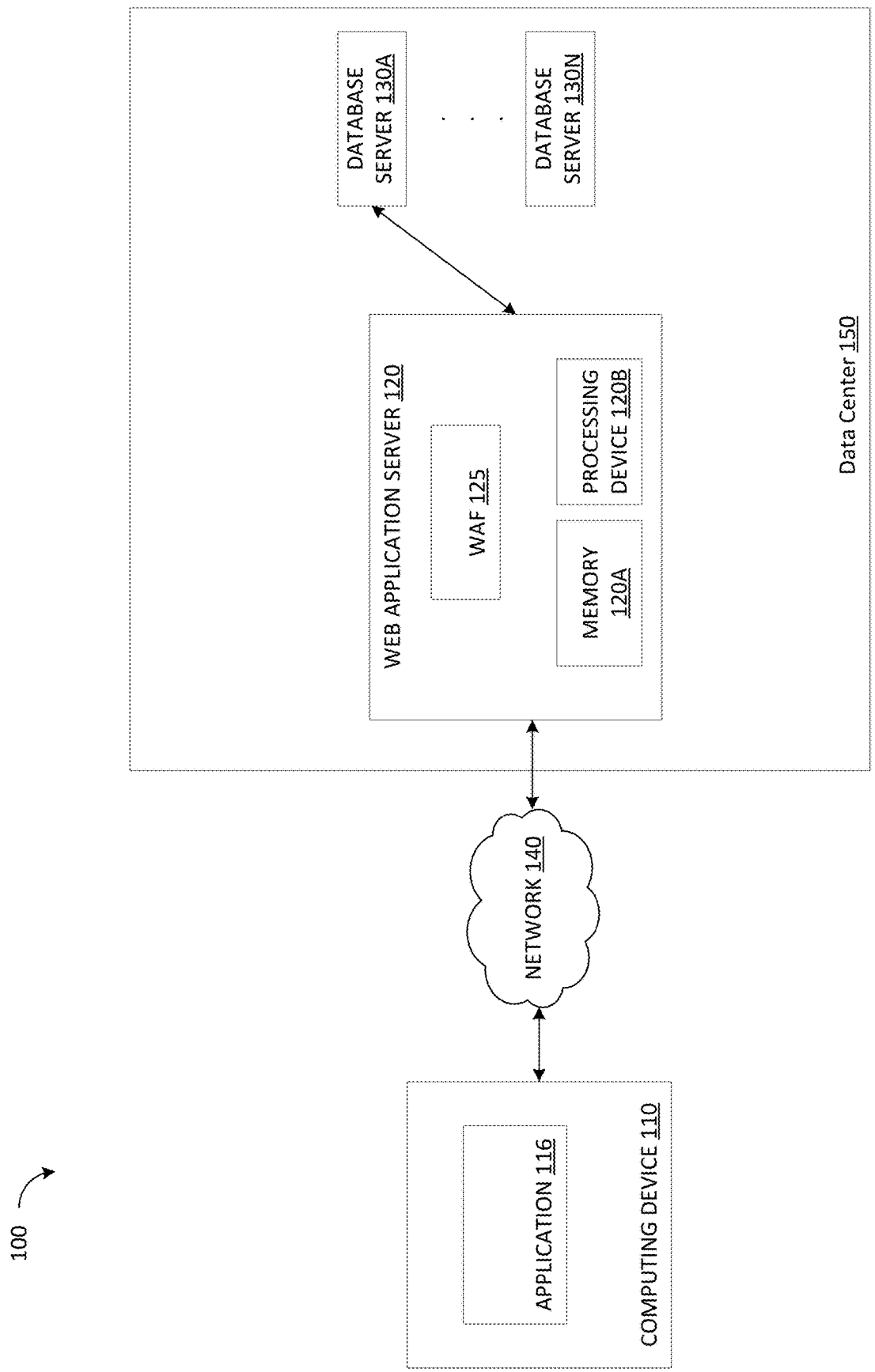
FIG. 1 is a block diagram that illustrates an example system, in accordance with some embodiments of the present disclosure.

A WAF may be implemented in a number of ways. First, a traditional (rules-based) WAF may detect network attacks by adhering to a set of rules that help determine what traffic is malicious and what traffic is safe. The set of rules may be created and managed by security experts. However, rules-based WAFs generally protect against specific attack vectors. Although the set of rules of a rules-based WAF can be modified to provide a response to varying attack vectors (e.g., rate limiting can be quickly implemented by modifying the set of rules of a rules-based WAF), for new/evolving threats, it can be difficult for a modification of the set of rules to be implemented rapidly enough to allow for an adequate response to such new/evolving threats.

In addition, WAFs may be implemented using machine learning (ML) based techniques. These ML WAFs may function more generically, and may detect attacks based on features of a request. For example, an ML WAF may be trained to detect attacks based on request features such as RCE keywords, N-grams, a client from which the request originated, and a location from which the request originated, among others. Because ML WAFs do not rely on specifically defined rules, they can detect attacks even when the attack vector is not specifically known. However, ML WAFs (like any other ML solution) operate almost like a black box, making it very difficult to understand why a specific request was classified as an attack. Although there are solutions for the ML explainability problem, such as SHapley Additive exPlanations (SHAP) and partial dependency plots, and these solutions can assist in understanding why an ML WAF classified a specific request in a certain way, they aren't normally further analyzed to extract insights about a group of events the ML WAF classified. Furthermore, in the event an ML WAF detects a new attack, it may not block all of its possible permutations, which can pose a potential security risk. Indeed, minor variations in attack vectors may elude an ML WAF.

The present disclosure addresses the above-noted and other deficiencies by using a processing device to analyze a plurality of attacks detected by a machine learning (ML) web application firewall (WAF) to determine a set of attacks of the plurality of attacks that were not identified as an attack by a rule-based WAF. For each attack of the set of attacks that were not identified as an attack by the rule-based WAF, the processing device may determine feature contribution data of the attack and group the set of attacks, using a clustering algorithm, into one or more clusters based on feature contribution data of each of the set of attacks. For each of the one or more clusters, the processing device may determine, based on feature contribution data of each attack in the cluster, a new attack vector/security vulnerability. The processing device may take any appropriate action based on the determined new attack vectors, including generating, for each new attack vector, a corresponding rule for use by the rule-based WAF to identify and block the new attack vector.

In some embodiments, a system is provided. The system comprising a memory and a processing device operatively coupled to the memory. The processing device may determine a plurality of requests that are each identified by both a machine learning (ML) web application firewall (WAF) and a rule-based WAF as an attack, wherein the rule-based WAF uses a set of rules to identify attacks. For each of the plurality of attacks, the processing device may determine feature contribution data of the attack and label feature contribution data of each of the plurality of attacks with a rule of the set of rules used by the rule-based WAF to identify the attack. The processing device may train, using the labeled feature contribution data of each of the plurality of attacks, a rule inference machine learning (ML) model to identify a rule among the set of rules that applies to feature contribution data of a given request. In response to receiving a request that is identified by the ML WAF as an attack but is not identified as an attack by the rule-based WAF, the processing device may determine, using the ML WAF, feature contribution data of the request. The processing device may then determine, using the rule inference ML model, a particular rule among the set of rules that applies to the feature contribution data of the request.

FIG. 1 is a block diagram that illustrates an example system 100. As illustrated in FIG. 1, the system 100 includes computing device 110 and a data center 150 comprising database servers 130A-130N and a web application server 120. The computing device 110 and the data center 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and the database servers 130 of the data center 150. The computing device 110, database servers 130, and the web application server 120 may each include hardware such as processing device 120B (e.g., processors, central processing units (CPUs)), memory 120A (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The database servers 130 may comprise one or more storage devices (e.g., hard-disk drive (HDD), and solid-state drives (SSD), etc.) for storing data and executing web applications (not shown).

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 110, database servers 130, and the web application server 120 may each comprise any suitable type of computing device or machine that has a programmable processor including, for example, server computers, desktop computers, laptop computers, tablet computers, smartphones, set-top boxes, etc. In some examples, the computing device 110, database servers 130, and the web application server 120 may each comprise a single machine or may include multiple interconnected machines (e.g., multiple servers configured in a cluster). The computing device 110, database servers 130, and the web application server 120 may be implemented by a common entity/organization or may be implemented by different entities/organizations. For example, computing device 110 may be operated by a first company/corporation and database servers 130 and web application server 120 may be operated by a second company/corporation. The computing device 110, database servers 130, and the web application server 120 may each execute or include an operating system (OS). The OSs of computing device 110, database servers 130, and the web application server 120 may manage the execution of other components (e.g., software, applications, etc.) and/or may manage access to the hardware (e.g., processors, memory, storage devices etc.) of the computing device.

As illustrated in FIG. 1, computing device 110 may run an application 116 which may allow a user to interact with data center 150. When the user wants to access the data center 150, they may utilize application 116 (which may be e.g., a client w/a graphical user interface (GUI)) to connect to a specific database server 130 of the data center 150 via the web application server 120. The application 116 may interact with the web application server 120 which may execute a WAF 125 that may analyze requests by the application 116 to access a database server 130 to determine if they are malicious/constitute an attack. The WAF 125 may be a software module stored in memory 120A and executed by processing device 120B, may be logic/firmware implemented directly on processing device 120B, or may comprise separate/dedicated hardware within the web application server 120. Although illustrated in an on-premises configuration in FIG. 1, the WAF 125 may be implemented in any appropriate configuration including deployment in a CDN, for example.

Figure 2:
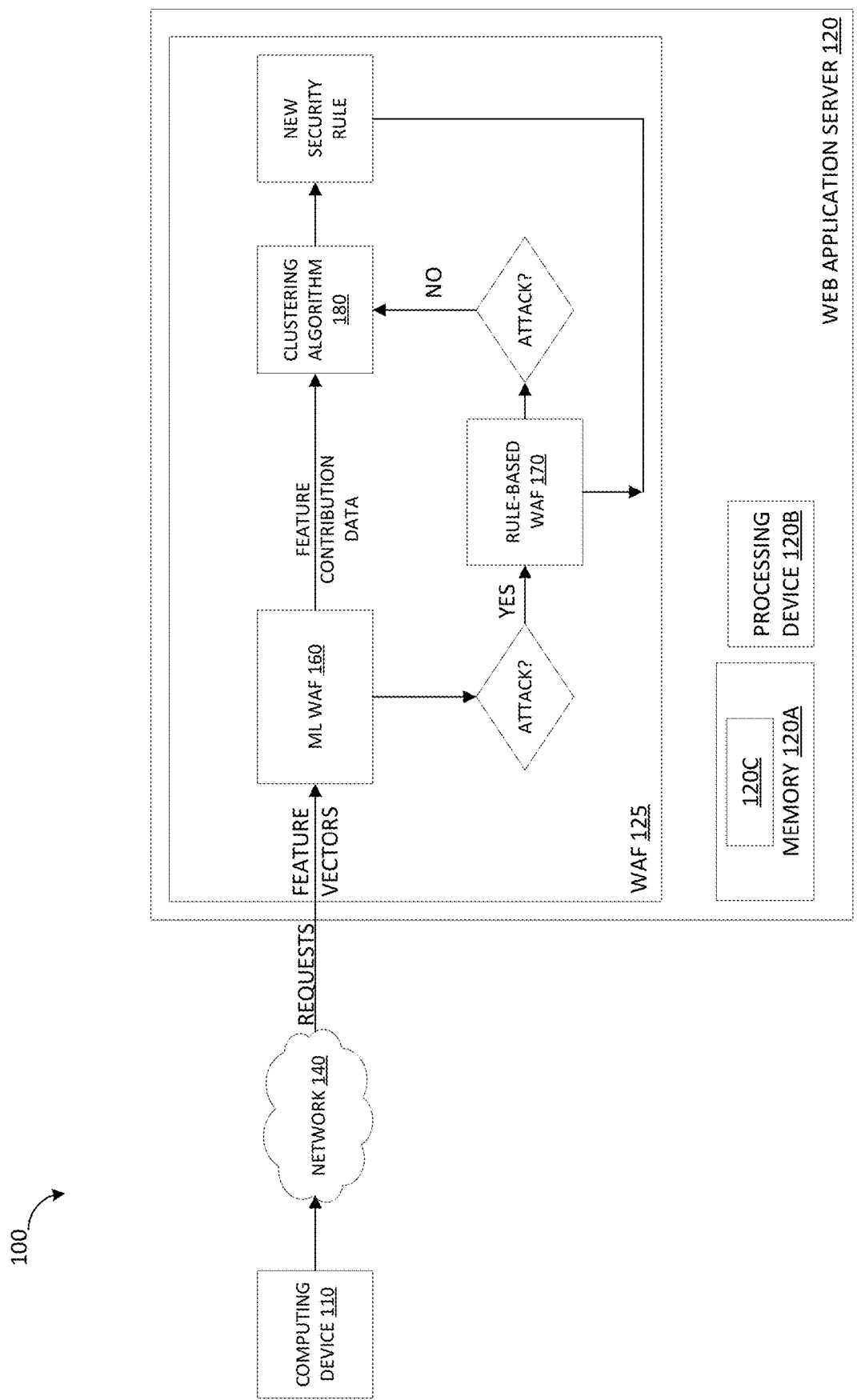
FIG. 2 is a block diagram that illustrates a detailed example system, in accordance with some embodiments of the present disclosure.

FIG. 2 illustrates the system 100 in accordance with some embodiments of the present disclosure. As can be seen, the WAF 125 of web application server 120 comprises a rule-based WAF 170 and a machine learning (ML) WAF 160. As discussed herein, the rule-based WAF 170 may utilize a set of rules (not shown) to block malicious HTTP/S requests (hereinafter referred to as requests) from the computing device 110 and may analyze each request at the application layer to determine whether the request matches with a particular rule. The set of rules may comprise generic detection rules as well as web application framework-specific rules that cover particular applications. In some embodiments, the rule-based WAF 170 may utilize a signature-based approach that aims to identify malicious incoming data using pattern matching techniques, so as to block previously identified patterns. For example, a particular rule of the set of rules may analyze a request to determine if the request includes an exact match of the string: "<script>alert( )/script>" which may have been previously identified as associated with an attack. The rule-based WAF 170 may block requests that include a match of a string of any of the set of rules, and allow requests that do not include a match of a string of any of the set of rules to pass.

The WAF 125 may also include an ML WAF 160, which may be trained to identify malicious requests based on features of the request. The ML WAF 160 may be trained using training data comprising previous requests that have each been broken into their component features (referred to herein as a feature set), where each request of the training data has been annotated to indicate whether it corresponded to an attack. During training, the ML WAF 160 may learn to identify those features (or combinations of features) that are indicative of an attack and which can be used to make predictions about requests. Examples of features in a request include RCE keywords (e.g., ".exe," "python," "nmap," "chr(," and "java"), N-grams (e.g., query string 4-grams such as "//..", "=UTF", "d=&c", "//"), a client from which the request originated (e.g., Python, Chrome, SQLMap), a number of "/" characters in the URL of the request (e.g., 1, 2, 3), a location from which the request originated, an internet protocol (IP) address from which the request originated, a length of the URL of the request, a distribution of the time intervals of the request, the sizes of HTTP objects within the request, and the distribution of HTTP status codes within the request, among others. Upon completion of the training, the ML WAF 160 may analyze feature sets of incoming requests and make predictions about whether they correspond to an attack. For example, N-grams are keywords (of size N) which are popular in attacks and rare in clean traffic. They are determined periodically based on recent attacks and recent clean traffic, and may be used by the ML WAF 160 to identify attacks. The dynamic nature of the ML WAF 160 may allow it to detect attacks that involve various combinations of these features which the rule-based WAF 170** cannot detect.

In contrast to the rule-based WAF 170, the ML WAF 160 may not provide a binary output indicating whether a request is an attack or not. Instead, the ML WAF 160 may deal in probability distributions and actions can then be initiated on the basis of these distributions. For example, the processing device 120B may terminate a session or temporarily block a source IP of a request if the ML WAF 160 indicates that there is a high probability that the request is an attack. In addition, the processing device 120B may only initiate other actions such as e.g., displaying a "Completely Automated Public Turing test to tell Computers and Humans Apart" (CAPTCHA) test (or other similar bot detection application) if the ML WAF 160 determines that there is a high probability that a request has been automated, for example by a bot. If the indicated probability of a request being an attack is not sufficiently high (e.g. the level of uncertainty is too high), the processing device 120B may also log the request details and/or send them to a peripheral system, such as a fraud detection system, which then conducts an initial analysis and may assist in making a decision. The ML WAF 160 may output an attack probability as a number between 0 and 1 where a 0 indicates that there is no chance the request is an attack and a 1 indicates that there is a 100% chance that the request is an attack. The ML WAF 160 may also assign to each feature of the request, an indication of its contribution to the attack probability (also referred to herein as the feature contribution), which may be a number between −1 and 1, where the attack probability is based on the sum of the feature contribution from each feature of the request (i.e., attack probability=SUM(feature contribution)). The feature contribution of all the features of a request may be referred to as feature contribution data.

In response to receiving a set of requests, the processing device 120B may analyze each request and break each request into a feature set. The processing device 120B may encode the feature set of each request (e.g., keywords, N-grams, and the originating client) to Boolean columns in a feature vector, as shown in FIG. 3 illustrating a set of feature vectors 300. Each row of the set of feature vectors 300 represents a request of the set of requests that has been transformed into a feature vector. For example, request 1 includes the RCE keyword ".exe" as well as a 4-gram "//.." and was generated using python, while request 2 includes the 4-gram//and was generated using python. Referring back to FIG. 2, the processing device 120B may then input the feature vectors for each of the set of requests to the ML WAF 160**.

For each of the feature vectors, the ML WAF 160 may analyze the feature vector and may generate an attack probability for the corresponding request, and may decompose the attack probability into feature contribution data, as shown in FIG. 4A. FIG. 4A illustrates a set of feature contribution data 400 corresponding to the feature vectors 300 illustrated in FIG. 3. As can be seen in FIG. 4A, each row represents the features of a request (requests 1-3) and indicates each feature's respective feature contribution to the attack probability. As shown, most features will have a zero feature contribution, and the sum of each row will be the attack probability—which should be above a threshold in order to be classified as having a high attack probability. In some embodiments, example thresholds for the ML WAF 160 to classify a request as having a high attack probability are between 0.5 and 0.8. The processing device 120B may also input the feature vectors to the rule-based WAF 170.

The processing device 120B (executing rule generation module 120C) may identify those rows of feature contribution data corresponding to requests that were identified as an attack (e.g., identified as having a high probability of being an attack—referred to herein as "attack probability") by the ML WAF 160 but which were not identified as an attack by the rule based WAF 170 (referred to herein as split classification requests). The processing device 120B may execute a clustering algorithm 180 in order to cluster the split classification requests into groups based on the feature contribution data of each request. This is because a dense cluster of many feature contributions with high contribution values may indicate a new attack.

Upon grouping the split classification requests, the processing device 120B may identify features that are part of a new attack vector as those features that have a high contribution to the attack probability of a number of attacks that is higher than a threshold number of attacks. A feature having a high contribution to an attack probability may be defined in a number of ways. For example, the processing device 120B may identify as high contribution features, those features that are among the top e.g., 3 contributing features in a number of split classification requests that is higher than a threshold number of split classification requests. In another example, the processing device 120B may identify as high contribution features, those features whose contribution to the attack probability is higher than the mean contribution of all features in a number of split classification requests that is higher than a threshold number of split classification requests. A threshold number of split classification requests may be defined based on a number of requests, a number of distinct sites in the cluster, and a number of IP addresses, among others.

The processing device 120B may then identify one or more new attack vectors based on the identified features and generate one or more new rules for the rule-based WAF 170 to use in identifying and blocking the new attack vectors. For example, the processing device 120B may identify the keywords ".exe" and "chr(" as features with high contributions in a number of split classification requests that is higher than a threshold number of split classification requests. In this case, the processing device 120B may identify a new attack vector where both of these keywords are present in the request and generate a new rule that identifies a request as an attack if both of these keywords are present in the request. In another example, the processing device 120B may identify the n-gram "=UTF" and 2 "/" characters as features with high contributions in a number of split classification requests that is higher than a threshold number of split classification requests. In this case, the processing device 120B may identify a new attack vector where both the n-gram "=UTF" and 2 "/" characters are present in the request and generate a new rule that identifies a request as an attack if both the n-gram "=UTF" and 2 "/" characters are present in the request.

The processing device 120B may continuously monitor incoming requests and update the list of requests that were identified as an attack by the ML WAF 160, but not the rule-based WAF 170, and may periodically use the clustering algorithm 180 to group the requests and generate new rules as discussed hereinabove. The processing device 120B may perform this process at any appropriate interval e.g., hourly, daily etc.

FIG. 4B illustrates another example of the rule-generation techniques described herein. FIG. 4B illustrates a query string 500 corresponding to a request that was not identified as an attack by the rule-based WAF 170, but was given a high attack probability by the ML WAF 160. After determining the feature contribution data for the query string 500 and grouping it with similar query strings (based on similar feature contribution data as discussed herein), the processing device 120B may identify the high contribution features 550. In the example of FIG. 4B, the high contribution features 550 may correspond to a query string 4-gram "t${a" and a python based client used to make the request. Stated differently, the attacker used python as a hacking tool, and the fact the tool used was the same among a threshold number of query strings in the cluster that the query string 500 was a part of helped to detect the python based client as part of the attack. Similarly, the specific 4-gram "t${a" was present among a threshold number of query strings in the cluster that the query string 500 was a part of (i.e., was rare in clean traffic, and popular in attacks). The combination of the two features assisted the processing device 120B in identifying this new attack. As can be seen, the techniques described herein can lead to the discovery of new attacks and new vulnerabilities before enclosure. Features like the client used to perpetuate the attack and the IP address from which the attack originated can help to group the data—even though in some cases such features may not be a part of a new attack vector, they can still be useful in finding the new attack vector. The techniques described herein allow the WAF 125 to detect when attackers have made small variations/changes to existing attack vectors. It should be noted that the attack vector may be decoupled from features like the client used to perform the attack and the IP address from which the attack originated (since the attack vector can originate from/be used by multiple clients/IP addresses) and for that reason these types of features may not be a part of the attack vector. In some embodiments, features that are decoupled from the attack vector may be used for grouping and may also be used to generate temporary rules.

Figure 5A:
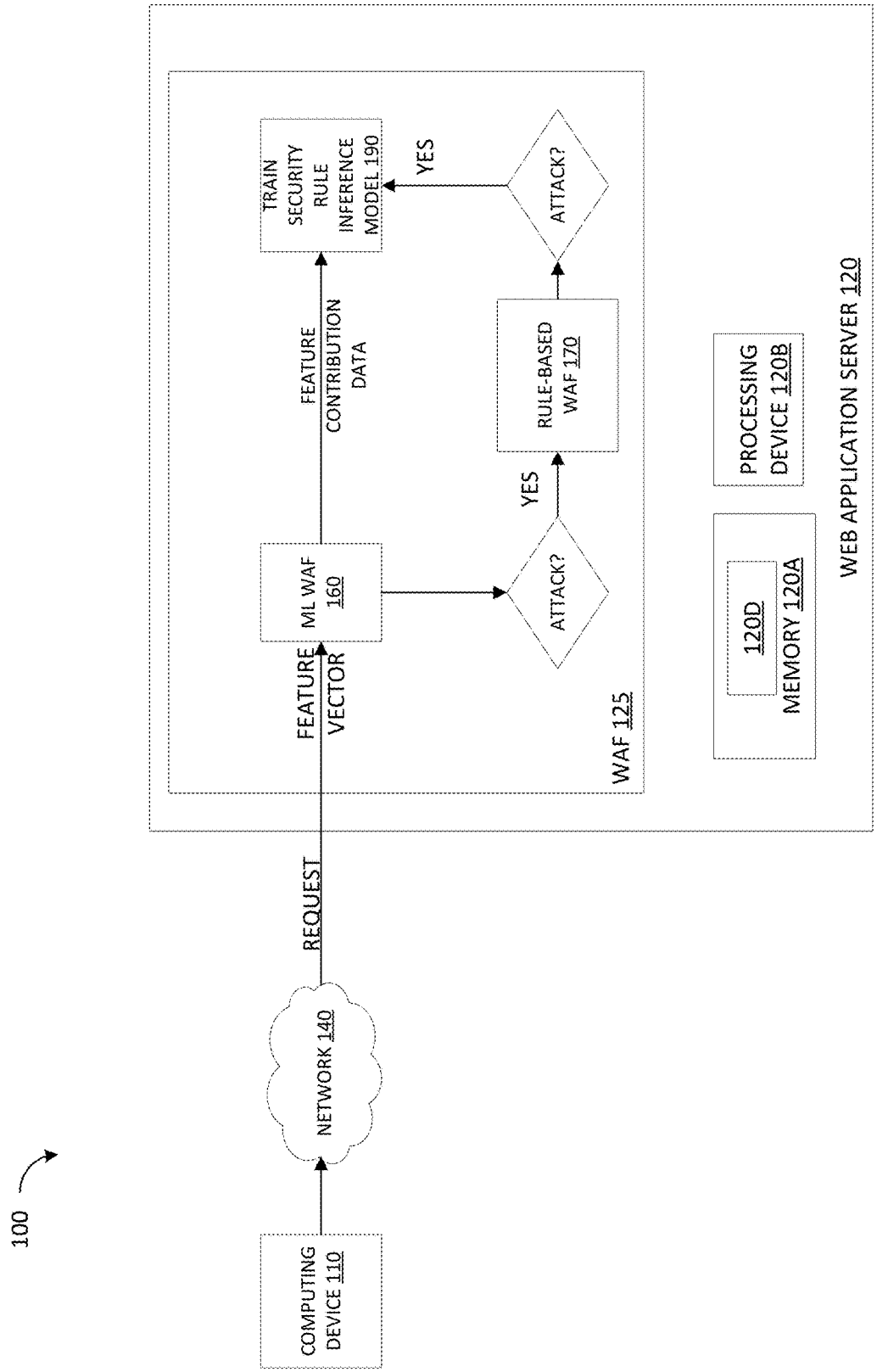
FIG. 5A is a block diagram that illustrates a detailed example system, in accordance with some embodiments of the present disclosure.

FIG. 5A illustrates the system 100 in accordance with some embodiments of the present disclosure wherein requests identified as having a high attack probability by the ML WAF 160 may be classified to one or more of the set of rules implemented by the rule-based WAF 170. Because the rule-based WAF 170 may use security rules to detect attacks, information about an attack can be derived based on knowledge of which security rule blocked it. More specifically, the processing device 120B may leverage the feature contribution data generated by the ML WAF 160 for attacks that were detected by both the ML WAF 160 and the rule-based WAF 170, to train an additional classification model (shown as security rule inference model 190 in FIG. 5A) that can detect a request's applicable security rule based on its feature contribution data. The security rule inference model 190 may be utilized to determine an existing rule of the rule-based WAF 170's rule set that would be most applicable to a request that was not blocked by the rule-based WAF 170. This will allow security experts to quickly identify the request's attack type and identify which security rule requires modification and modify it.

For each request that is identified as having a high attack probability by the ML WAF 160 and is identified as an attack by the rule based WAF 170, the rule used by the rule-based WAF 170 to identify the request as an attack may be used to label the corresponding feature contribution data of the request generated by the ML WAF 160. This labeled data may be used to train the security rule inference model 190 to identify an applicable rule based on feature contribution data. FIG. 6A illustrates a set of feature contribution data 600, which includes feature contribution data for 3 requests (shown as requests 1-3 in FIG. 6A) identified as having a high attack probability by the ML WAF 160 and identified as an attack by the rule based WAF 170. The feature contribution data for each request 1-3 has been labeled with the rule that the rule-based WAF 170 used to identify the request as an attack, which in the example of FIG. 6A is a cross-site scripting (XSS) rule that looks for a perfect match on the following string "<script>alert( )/script>." This data may be used to train the security rule inference model 190 to identify an applicable rule that would be used by the rule-based WAF 170 to identify a particular request as an attack based on feature contribution data of the particular request.

Figure 5B:
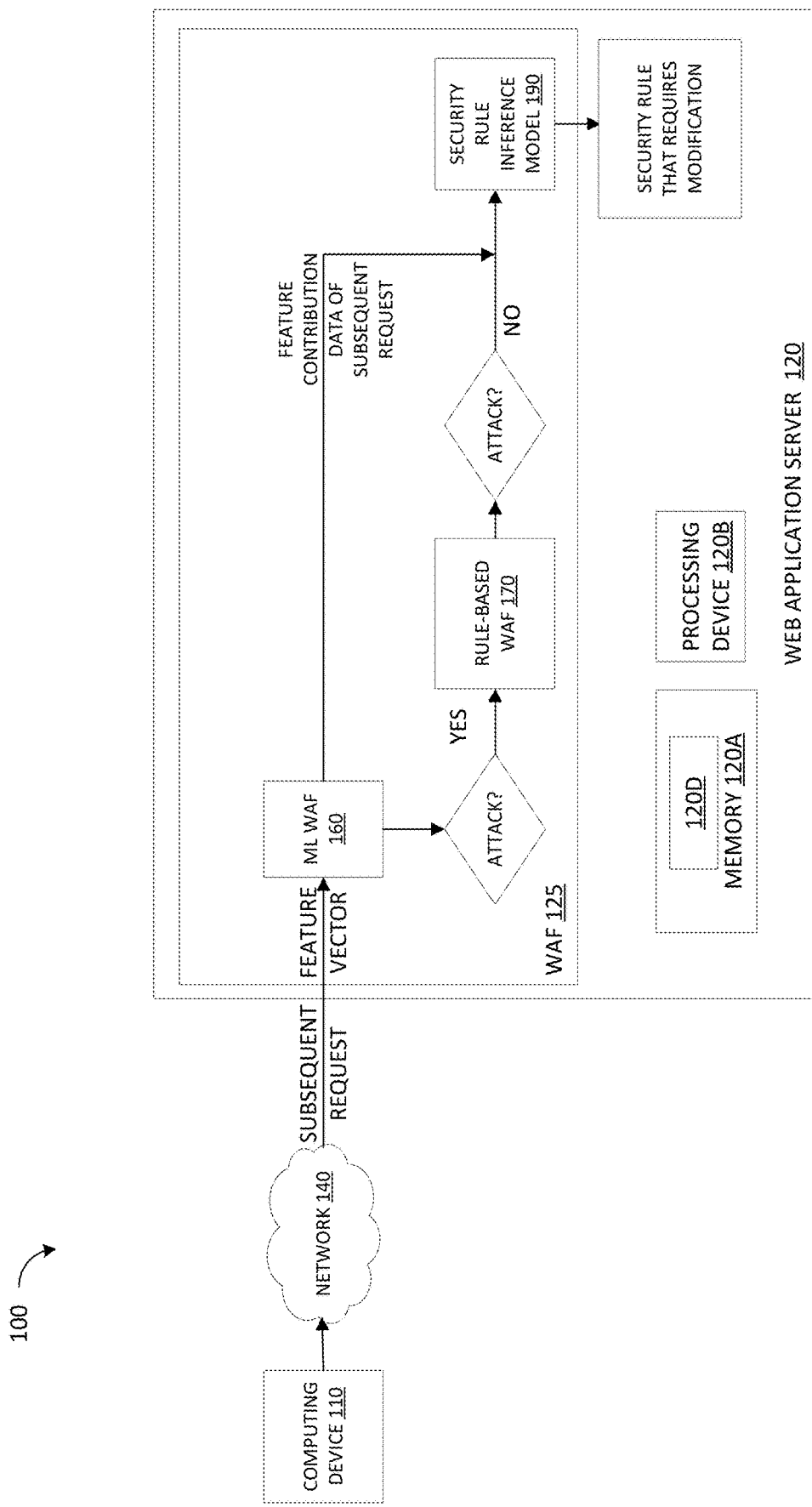
FIG. 5B is a block diagram that illustrates a detailed example system, in accordance with some embodiments of the present disclosure.

Referring now to FIG. 5B, in response to receiving a subsequent request that is identified as having a high attack probability by the ML WAF 160 but which was not identified as an attack by the rule based WAF 170, the processing device 120B (executing rule-inference module 120D) may provide the feature contribution data for the subsequent request as an input to the security rule inference model 190, which may identify the applicable rule from the rule set utilized by the rule-based WAF 170 based on the feature contribution data. For example, the web application server 120 may receive a request comprising the query string "search=<script>alert(100)</script>," which may be classified as an attack by the ML WAF 160 but not by the rule-based WAF 170 (owing to the slight differences between the query string and the string in the XSS rule shown above). In response, the processing device 120B may provide the feature contribution data of the subsequent request generated by the ML WAF 160 (shown in FIG. 6B) to the security rule inference model 190. The security rule inference model 190 may classify the feature contribution data as corresponding to the XSS rule, and provide an indication (e.g., to a security administrator) that the XSS rule needs to be edited/modified so that it can identify variants of the "<script>alert( )/script>" string.

FIG. 7 is a flow diagram of a method 700 for generating new security rules based on feature contribution data of received requests, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., web application server 120 (via processing device 120B) illustrated in FIG. 2).

In response to receiving a set of requests, the processing device 120B may analyze each request and break each request into a feature set. The processing device 120B may encode the feature set of each request (e.g., keywords, N-grams, and the originating client) to Boolean columns in a feature vector, as shown in FIG. 3 illustrating a set of feature vectors 300. Each row of the set of feature vectors 300 represents a request of the set of requests that has been transformed into a feature vector. For example, request 1 includes the RCE keyword ".exe" as well as a 4-gram "//.." and was generated using python, while request 2 includes the 4-gram//and was generated using python. Referring back to FIG. 2, the processing device 120B may then input the feature vectors for each of the set of requests to the ML WAF 160**.

For each of the feature vectors, the ML WAF 160 may analyze the feature vector and may generate an attack probability for the corresponding request, and may decompose the attack probability into feature contribution data, as shown in FIG. 4A. FIG. 4A illustrates a set of feature contribution data 400 corresponding to the feature vectors 300 illustrated in FIG. 3. As can be seen in FIG. 4A, each row represents the features of a request (requests 1-3) and indicates each feature's respective feature contribution to the attack probability. As shown, most features will have a zero feature contribution, and the sum of each row will be the attack probability—which should above a threshold in order to be classified as having a high attack probability. In some embodiments, example thresholds for the ML WAF 160 to classify a request as having a high attack probability are between 0.5 and 0.8. The processing device 120B may also input the feature vectors to the rule-based WAF 170.

At block 705, the processing device 120B (executing rule generation module 120C) may identify those rows of feature contribution data corresponding to requests that were identified as an attack (e.g., identified as having a high probability of being an attack—referred to herein as "attack probability") by the ML WAF 160 but which were not identified as an attack by the rule based WAF 170 (referred to herein as split classification requests). At block 710, the processing device 120B may obtain the feature contribution data for each of the split classification requests and at block 715, the processing device 120B may execute a clustering algorithm 180 in order to cluster the split classification requests into groups based on the feature contribution data of each request. A dense cluster, of many contribution vectors, and with high contributions values, may indicate a new attack.

Upon grouping the split classification requests, the processing device 120B may identify features that are part of a new attack vector as those features that have a high contribution to the attack probability of a number of attacks that is higher than a threshold number of attacks. A feature having a high contribution to an attack probability may be defined in a number of ways. For example, the processing device 120B may identify as high contribution features, those features that are among the top e.g., 3 contributing features in a number of requests that is higher than a threshold number of requests. In another example, the processing device 120B may identify as high contribution features, those features whose contribution to the attack probability is higher than the mean contribution of all features in a number of split classification requests that is higher than a threshold number of split classification requests. A threshold number of split classification requests may be defined based on a number of requests, a number of distinct sites in the cluster, and a number of IP addresses, among others.

At block 720, the processing device 120B may then identify one or more new attack vectors based on the identified features and generate one or more new rules for the rule-based WAF 170 to use in identifying and blocking the new attack vectors. For example, the processing device 120B may identify the keywords ".exe" and "chr(" as features with high contributions in a number of split classification requests that is higher than a threshold number of split classification requests. In this case, the processing device 120B may identify a new attack vector where both of these keywords are present in the request and generate a new rule that identifies a request as an attack if both of these keywords are present in the request. In another example, the processing device 120B may identify the n-gram "=UTF" and 2 "/" characters as features with high contributions in a number of split classification requests that is higher than a threshold number of split classification requests. In this case, the processing device 120B may identify a new attack vector where both the n-gram "=UTF" and 2 "/" characters are present in the request and generate a new rule that identifies a request as an attack if both the n-gram "=UTF" and 2 "/" characters are present in the request.

Figure 8:
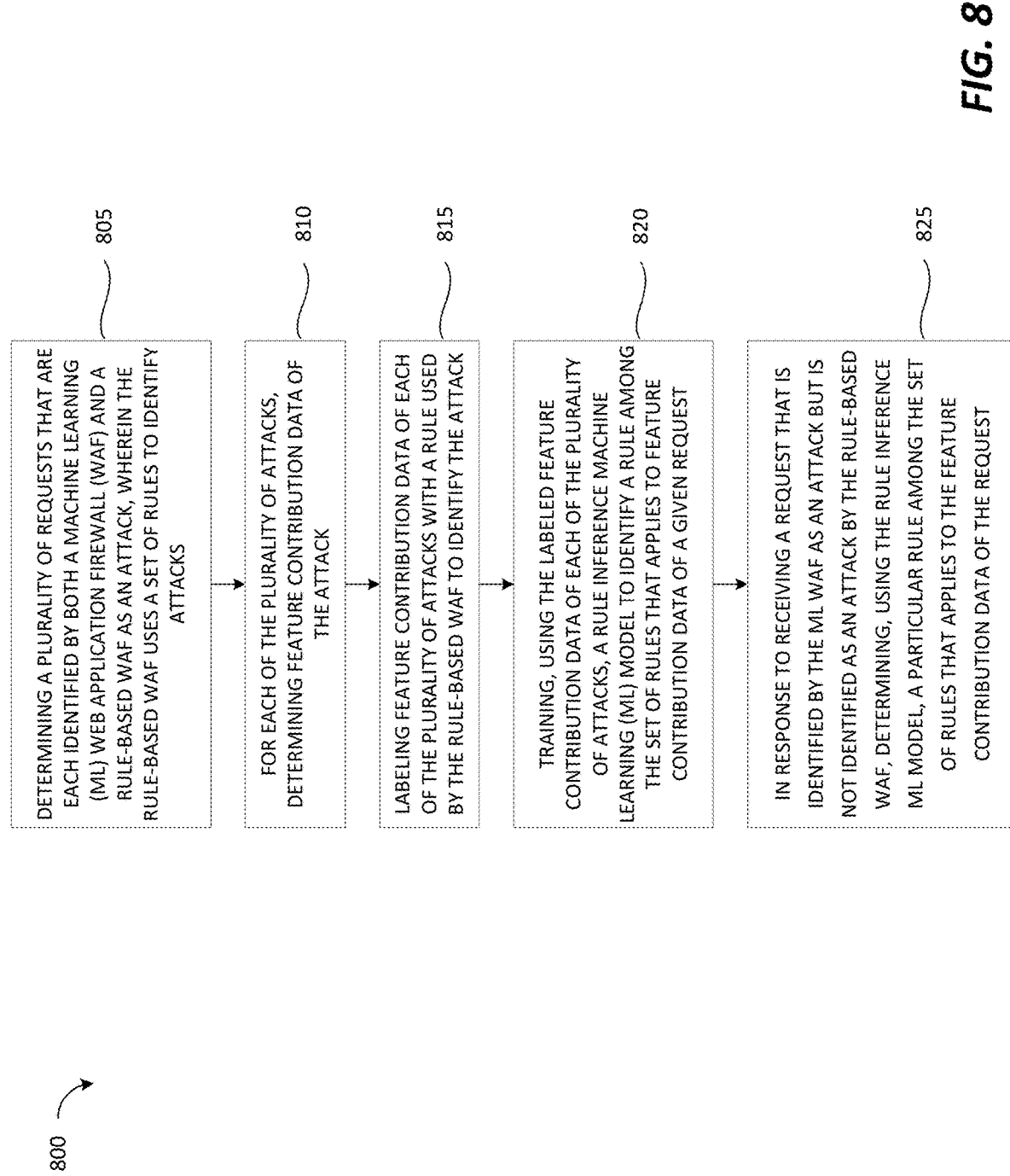
FIG. 8 is a flow diagram of a method for identifying rules used by a rule-based WAF that require modification, in accordance with some embodiments of the present disclosure.

FIG. 8 is a flow diagram of a method 800 for identifying security rules that are not sufficiently comprehensive, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by a computing device (e.g., processing device 120B illustrated in FIG. 5).

Reference is also made to FIG. 5A, which illustrates the system 100 in accordance with some embodiments of the present disclosure wherein requests identified as having a high attack probability by the ML WAF 160 may be classified to one or more of the set of rules implemented by the rule-based WAF 170. Because the rule-based WAF 170 may use security rules to detect attacks, information about an attack can be derived based on knowledge of which security rule blocked it. More specifically, the processing device 120B may leverage the feature contribution data generated by the ML WAF 160 for attacks that were detected by both the ML WAF 160 and the rule-based WAF 170 to train an additional classification model (shown as security rule inference model 190 in FIG. 5A) that can detect a request's applicable security rule based on its feature contribution data. The security rule inference model 190 may be utilized to determine an existing rule of the rule-based WAF 170's rule set that would be most applicable to a request that was not blocked by the rule-based WAF 170. This will allow security experts to quickly identify the request's attack type and identify which security rule requires modification and modify it.

At block 805, the processing device 120B may determine each request that is identified as having a high attack probability by the ML WAF 160 and is identified as an attack by the rule based WAF 170. At block 810, the processing device 120B may obtain the feature contribution data for each of these requests and at block 815 the rule used by the rule-based WAF 170 to identify each request as an attack may be used to label the corresponding feature contribution data of the request. At block 820, this labeled data may be used to train the security rule inference model 190 to identify an applicable rule based on feature contribution data. FIG. 6A illustrates a set of feature contribution data 600, which includes feature contribution data for 3 requests (shown as requests 1-3 in FIG. 6A) identified as having a high attack probability by the ML WAF 160 and identified as an attack by the rule based WAF 170. The feature contribution data for each request 1-3 has been labeled with the rule that the rule-based WAF 170 used to identify the request as an attack, which in the example of FIG. 6A is a cross-site scripting (XSS) rule that looks for a perfect match on the following string "<script>alert( )/script>." This data may be used to train the security rule inference model 190 to identify an applicable rule that would be used by the rule-based WAF 170 to identify a particular request as an attack based on feature contribution data of the particular request.

Referring also now to FIG. 5B, at block 825, in response to receiving a subsequent request that is identified as having a high attack probability by the ML WAF 160 but which was not identified as an attack by the rule based WAF 170, the processing device 120B (executing rule-inference module 120D) may provide the feature contribution data for the subsequent request as an input to the security rule inference model 190, which may identify the applicable rule from the rule set utilized by the rule-based WAF 170 based on the feature contribution data of the subsequent request. For example, the web application server 120 may receive a request comprising the query string "search=<script>alert (100)</script>," which may be classified as an attack by the ML WAF 160 but not by the rule-based WAF 170 (owing to the slight differences between the query string and the string in the XSS rule shown above). In response, the processing device 120B may provide the feature contribution data of the subsequent request generated by the ML WAF 160 (shown in FIG. 6B) to the security rule inference model 190. The security rule inference model 190 may classify the feature contribution data as corresponding to the XSS rule, and provide an indication (e.g., to a security administrator) that the XSS rule needs to be edited/modified so that it can identify variants of the "<script>alert( )/script>" string.

Figure 9:
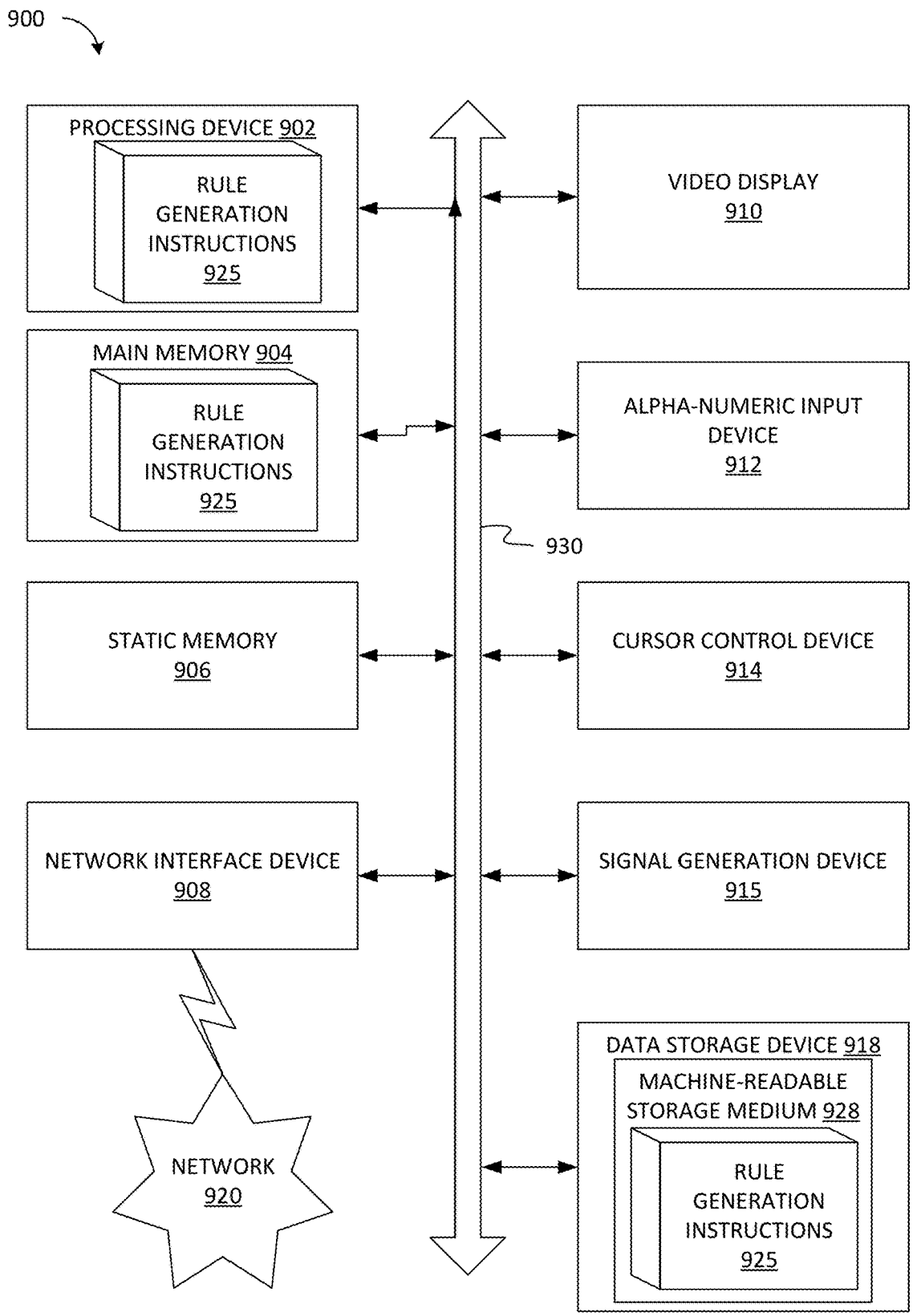
FIG. 9 is a block diagram of an example computing device that may perform one or more of the operations described herein, in accordance with some embodiments of the present disclosure.

FIG. 9 illustrates a diagrammatic representation of a machine in the example form of a computer system 900 within which a set of instructions, for causing the machine to perform any one or more of the methodologies discussed herein for generating a high level security policy.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server.

The example computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912 and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute rule generation instructions 925 for performing the operations and steps discussed herein.

The data storage device 915 may include a machine-readable storage medium 928, on which is stored one or more sets of rule generation instructions 925 (e.g., software) embodying any one or more of the methodologies of functions described herein. The rule generation instructions 925 may also reside, completely or at least partially, within the main memory 904 or within the processing device 902 during execution thereof by the computer system 900; the main memory 904 and the processing device 902 also constituting machine-readable storage media. The rule generation instructions 925 may further be transmitted or received over a network 920 via the network interface device 908.

The machine-readable storage medium 928 may also be used to store instructions to perform a method for generating a high level security policy, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
analyzing a plurality of attacks detected by a machine learning (ML) web application firewall (WAF) to determine a set of attacks of the plurality of attacks that were not identified as an attack by a rule-based WAF;
for each attack of the set of attacks that were not identified as an attack by the rule-based WAF, determining feature contribution data of the attack;
grouping, using a clustering algorithm, the set of attacks into one or more clusters based on feature contribution data of each of the set of attacks; and
for each of the one or more clusters:
determining, by a processing device, one or more features that have a high feature contribution to an attack probability of at least a threshold number of attacks of the cluster, wherein the high feature contribution of the one or more features are identified either as
  a) top contributing features in a number of split classification requests that is higher than a threshold number of the split classification requests, or
  b) features whose contribution to the attack probability is higher than a mean contribution of all of the one or more features in the number of the split classification requests that is higher than the threshold number of the split classification requests;
identifying, by the processing device, a new attack vector based on the one or more features of each attack in the cluster; and
generating a new rule for use by the rule-based WAF to identify the new attack vector.

2. The method of claim 1, wherein determining feature contribution data of an attack comprises:
determining a feature set of the attack, the feature set of the attack indicating features that the attack is comprised of;
determining, using the ML WAF, an attack probability of the attack based on the feature set; and
decomposing the attack probability of the attack into a feature contribution made by each feature of the feature set of the attack to determine the feature contribution data of the attack.

3. The method of claim 1, wherein generating the new rule comprises:
generating a rule indicating that a request having features matching the determined one or more features corresponds to an attack.

4. The method of claim 2, wherein a feature set of an attack comprises one or more of: a set of RCE keywords, a set of query string N-grams, a client from which the attack was generated, a number of slash characters in a uniform resource locator (URL) of the attack, a location from which the attack originated, and a length of the URL of the attack.

5. The method of claim 1, further comprising:
updating a set of security rules of the rule-based WAF with the new rule generated for each of the one or more clusters.

6. The method of claim 5, further comprising:
receiving a request; and
in response to determining, by the rule-based WAF, that a feature set of the request includes features matching the new rule generated for any of the one or more clusters, taking one or more preventative actions.

7. A system comprising:
a memory; and
a processing device operatively coupled to the memory, the processing device to:
determine a plurality of requests that are each identified by both a machine learning (ML) web application firewall (WAF) and a rule-based WAF as an attack, wherein the rule-based WAF uses a set of rules to identify attacks;
for each of the plurality of attacks, determine feature contribution data of the attack;
group, using a clustering algorithm, the plurality of attacks into one or more clusters based on feature contribution data;
determine one or more features that have a high feature contribution to an attack probability of at least a threshold number of attacks of the cluster, wherein the high feature contribution of the one or more features are identified either as
a) top contributing features in a number of split classifacation requests that is higher than a threshold number of the split classifcation requests, or
b) features whose contribution to the attack probability is higher than a mean contribution of all of the one or more features in the number of the split classifacation requests that is higher than the threshold number of the split classification requests;
identify a new attack vector based on the one or more features of each attack in the cluster; and
generate a new rule for use by the rule-based WAF to identify the new attack vector.

8. The system of claim 7, wherein the processing device is further to:
in response to receiving a request that is identified by the ML WAF as an attack but is not identified as an attack by the rule-based WAF, determine by the ML WAF, feature contribution data of the request; and
determine, using the rule inference ML model, a particular rule among the set of rules that applies to the feature contribution data of the request.

9. The system of claim 8, wherein the processing device is further to:
provide an indication that the particular rule requires modification.

10. The system of claim 9, wherein the processing device is further to:
receive an updated version of the particular rule; and
update the set of security rules of the rule-based WAF with the updated version of the particular rule.

11. The system of claim 10, wherein the processing device is further to:
receive a subsequent request; and
in response to determining, by the rule-based WAF, that a feature set of the subsequent request includes features matching the updated version of the particular rule, take one or more preventative actions.

12. The system of claim 7, wherein to determine feature contribution data of an attack, the processing device is to:
determine a feature set of the attack, the feature set of the attack indicating features that the attack is comprised of;
determine, using the ML WAF, an attack probability of the attack based on the feature set; and
decompose the attack probability of the attack into a feature contribution made by each feature of the feature set of the attack to determine the feature contribution data of the attack.

13. The system of claim 12, wherein a feature set of an attack comprises one or more of: a set of RCE keywords, a set of query string N-grams, a client from which the attack was generated, a number of slash characters in a uniform resource locator (URL) of the attack, a location from which the attack originated, and a length of the URL of the attack.

14. A non-transitory computer-readable medium having instructions stored thereon which, when executed by a processing device, cause the processing device to:
analyze a plurality of attacks detected by a machine learning (ML) web application firewall (WAF) to determine a set of attacks of the plurality of attacks that were not identified as an attack by a rule-based WAF;
for each attack of the set of attacks that were not identified as an attack by the rule-based WAF, determine feature contribution data of the attack;
group, using a clustering algorithm, the set of attacks into one or more clusters based on feature contribution data of each of the set of attacks; and
for each of the one or more clusters:
determining, by the processing device, one or more features that have a high feature contribution to an attack probability of at least a threshold number of attacks of the cluster, wherein the high feature contribution of the one or more features are identified either as a) top contributing features in a number of split classification requests that is higher than a threshold number of the split classification requests, or
b) features whose contribution to the attack probability is higher than a mean contribution of all of the one or more features in the number of the split classification requests that is higher than the threshold number of the split classification requests;

identify, by the processing device, a new attack vector based on the one or more features of each attack in the cluster; and generate a new rule for use by the rule-based WAF to identify the new attack vector.

15. The non-transitory computer-readable medium of claim 14,
wherein to determine feature contribution data of an attack, the processing device is to:
determine a feature set of the attack, the feature set of the attack indicating features that the attack is comprised of;
determine, using the ML WAF, an attack probability of the attack based on the feature set; and
decompose the attack probability of the attack into a feature contribution made by each feature of the feature set of the attack to determine the feature contribution data of the attack.

16. The non-transitory computer-readable medium of claim 14,
wherein to generate the new rule, the processing device is to:
generate a rule indicating that a request having features matching the determined one or more features corresponds to an attack.

17. The non-transitory computer-readable medium of claim 15,
wherein a feature set of an attack comprises one or more of: a set of RCE keywords, a set of query string N-grams, a client from which the attack was generated, a number of slash characters in a uniform resource locator (URL) of the attack, a location from which the attack originated, and a length of the URL of the attack.

18. The non-transitory computer-readable medium of claim 14,
wherein the processing device is further to:
update a set of security rules of the rule-based WAF with the new rule generated for each of the one or more clusters.

* * * * *